United States Patent
Cho et al.

(10) Patent No.: US 9,488,806 B2
(45) Date of Patent: Nov. 8, 2016

(54) PHOTOGRAPHIC LENS OPTICAL SYSTEM

(71) Applicant: KOLEN CO., LTD., Seongnam-si (KR)

(72) Inventors: Jae Hoon Cho, Seongnam-si (KR); Chi Ho Ahn, Seongnam-si (KR); Ji Eun Kim, Seongnam-si (KR); Se Jin Kim, Seoul (KR); Seong Hee Bae, Daejeon (KR)

(73) Assignee: KOLEN CO., LTD. (KR)

( * ) Notice: Subject to any disclaimer, the term of this patent is extended or adjusted under 35 U.S.C. 154(b) by 67 days.

(21) Appl. No.: 14/567,794

(22) Filed: Dec. 11, 2014

(65) Prior Publication Data

US 2015/0177490 A1 Jun. 25, 2015

(30) Foreign Application Priority Data

Dec. 24, 2013 (KR) .................. 10-2013-0162912

(51) Int. Cl.
*G02B 13/18* (2006.01)
*G02B 13/00* (2006.01)
*G02B 9/62* (2006.01)

(52) U.S. Cl.
CPC ............ *G02B 13/0045* (2013.01); *G02B 9/62* (2013.01)

(58) Field of Classification Search
CPC ............ G02B 9/00; G02B 9/60; G02B 9/62; G02B 13/00; G02B 13/001; G02B 13/002; G02B 13/0045; G02B 13/006; G02B 13/18
See application file for complete search history.

(56) References Cited

U.S. PATENT DOCUMENTS

| 2,687,063 A * | 8/1954 | Coleman | G02B 13/00 359/649 |
|---|---|---|---|
| 6,124,978 A | 9/2000 | Yoneyama | |
| 6,636,364 B2 | 10/2003 | Sato | |
| 8,854,701 B2 | 10/2014 | Nakayama et al. | |
| 8,995,062 B2 | 3/2015 | Yun et al. | |

(Continued)

FOREIGN PATENT DOCUMENTS

| CN | 103081458 A | 5/2013 |
|---|---|---|
| CN | 103309016 A | 9/2013 |

(Continued)

OTHER PUBLICATIONS

Korean Intellectual Property Office Notice of Non-Final Rejection Application No. 10-2013-0162912 Date: Dec. 24, 2013 pp. 8.

*Primary Examiner* — Thong Nguyen
(74) *Attorney, Agent, or Firm* — St. Onge Steward Johnston & Reens, LLC

(57) ABSTRACT

A photographic lens optical system includes: a first lens having a positive refractive power and a meniscus shape convex toward an object side; a second lens having a negative refractive power and a meniscus shape convex toward the object side; a doublet lens having a positive refractive power and formed by combining a third lens and a fourth lens; a fifth lens having a positive refractive power and a double convex shape; and a sixth lens having a positive refractive power and a double convex shape. The first to sixth lenses are sequentially arranged in a direction from the object side to an image side, and the photographic lens optical system satisfies the following condition:

$$1.5 < Nd2 < 1.7$$

where Nd2 denotes a refractive index of the second lens.

11 Claims, 6 Drawing Sheets

(56) References Cited

U.S. PATENT DOCUMENTS

| | | |
|---|---|---|
| 2011/0134540 A1 | 6/2011 | Kim |
| 2012/0026608 A1 | 2/2012 | Mori et al. |
| 2012/0081799 A1* | 4/2012 | Tseng ............... G02B 13/18 359/713 |
| 2013/0141801 A1* | 6/2013 | Yun ..................... G02B 9/62 359/716 |

FOREIGN PATENT DOCUMENTS

| | | |
|---|---|---|
| EP | 2490061 A1 | 8/2012 |
| JP | 200039555 A | 2/2000 |
| JP | 2004325498 A | 11/2004 |
| JP | 2010249946 A | 11/2010 |
| KR | 20110062998 A | 6/2011 |
| TW | 201213925 A | 4/2012 |

* cited by examiner

PHOTOGRAPHIC LENS OPTICAL SYSTEM

FIELD OF THE INVENTION

One or more embodiments of the present invention relate to an optical device, and more particularly, to a photographic lens optical system for cameras of vehicles.

BACKGROUND OF THE INVENTION

Recently, the use of cameras including solid-state imaging devices such as charge coupled devices (CCDs) or complimentary metal oxide semiconductor (CMOS) image sensors has greatly increased.

Also, the degree of pixel integration in solid-state imaging devices has been increased to improve the resolution of cameras. Along with this, small and lightweight cameras have been developed by improving the performance of lens optical systems included in the cameras.

In general, the use of more lenses in a lens optical system may be effective in guaranteeing high optical performance such as a wide angle of view, a high magnification, and correction of aberrations. However, if a lens optical system includes many lenses, providing small, lightweight, and inexpensive cameras may not be possible. On the other hand, if the number of lenses included in a lens optical system is decreased, aberrations may not be sufficiently corrected even though such a lens optical system may be suitable in terms of product size and price competitiveness.

Therefore, it is necessary to design lens optical systems that have appropriate optical performance and are suitable for obtaining cameras with reduced size, weight, and costs.

SUMMARY OF THE INVENTION

One or more embodiments of the present invention include a lens optical system suitable for size/weight reduction of a camera and having a high performance.

Additional aspects will be set forth in part in the description which follows and, in part, will be apparent from the description, or may be learned by practice of the presented embodiments.

According to one or more embodiments of the present invention, a photographic lens optical system includes: a first lens having a positive refractive power and a meniscus shape convex toward an object side; a second lens having a negative refractive power and a meniscus shape convex toward the object side; a doublet lens having a positive refractive power and formed by combining a third lens and a fourth lens; a fifth lens having a positive refractive power and a double convex shape; and a sixth lens having a positive refractive power and a double convex shape, wherein the first to sixth lenses are sequentially arranged in a direction from the object side to an image side, and the photographic lens optical system satisfies the following condition:

$$1.5 < Nd2 < 1.7$$

where Nd2 denotes a refractive index of the second lens.

The doublet lens may have a concave object-side surface.

The third lens may be a double concave lens, and the fourth lens may be a double convex lens.

The photographic lens optical system may satisfy the following condition:

$$BFL/f < 1.4$$

where BFL and f denote a back focal length and a focal length of the photographic lens optical system, respectively.

At least one lens of the photographic lens optical system may be formed of a plastic material.

The second lens may be formed of a plastic material.

The second lens may have at least one aspheric surface.

The photographic lens optical system may further include an aperture stop disposed between the second lens and the third lens.

According to one or more embodiments of the present invention, a photographing apparatus includes: the photographic lens optical system; and an image sensor converting an optical image formed by the photographic lens optical system into an electric signal.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE INVENTION

Figure 1:
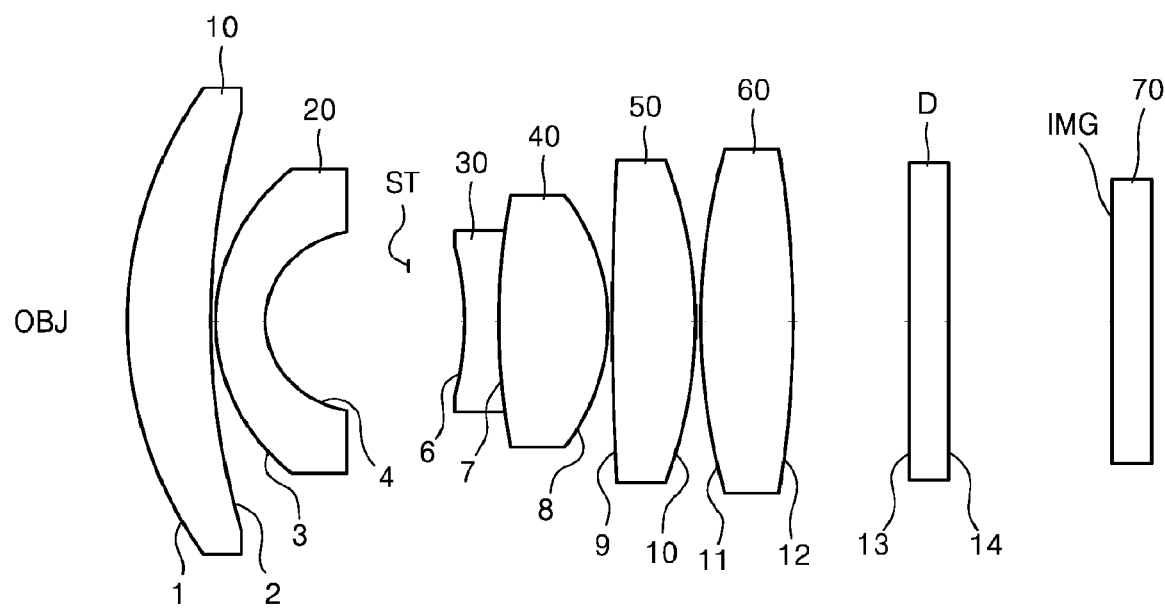
FIG. 1 is a cross-sectional view illustrating an optical arrangement of a photographic lens optical system according to a first embodiment of the present invention.

Reference will now be made in detail to embodiments, examples of which are illustrated in the accompanying drawings, wherein like reference numerals refer to like elements throughout and the size of each element may be exaggerated for clarity of illustration. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 3:
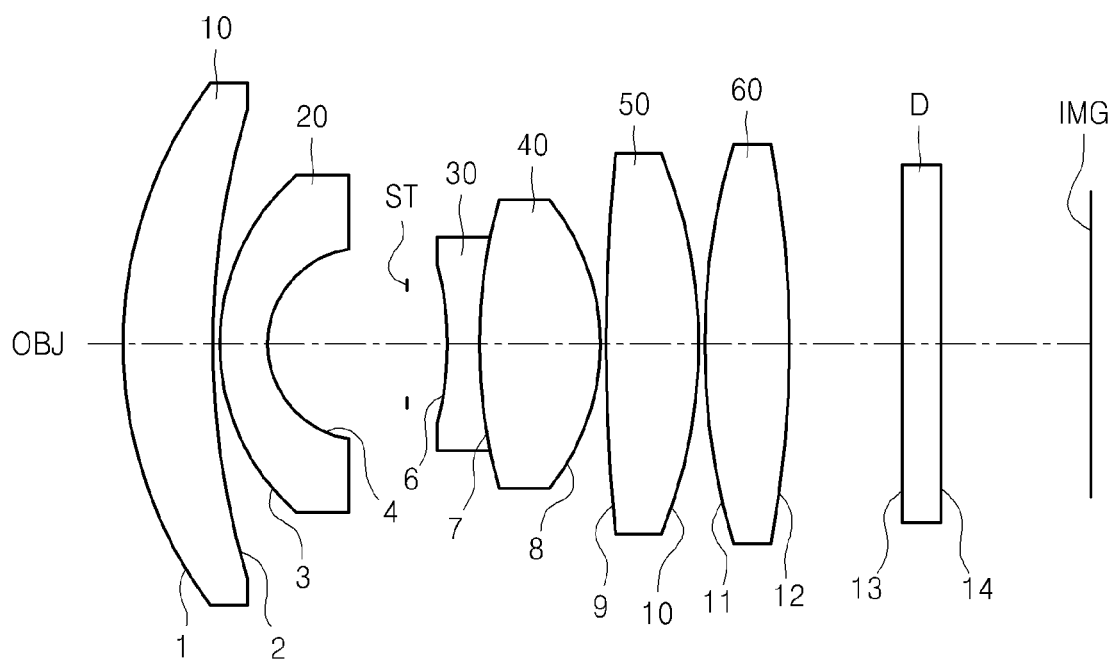
FIG. 3 is a cross-sectional view illustrating an optical arrangement of a photographic lens optical system according to a second embodiment of the present invention.
Figure 5:
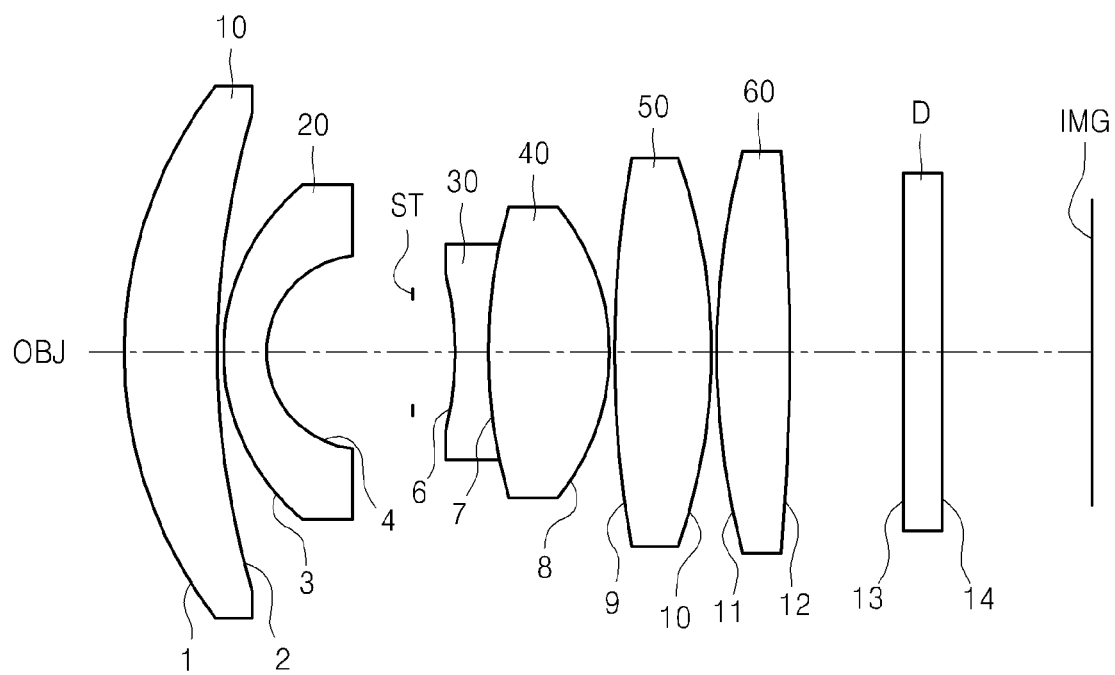
FIG. 5 is a cross-sectional view illustrating an optical arrangement of a photographic lens optical system according to a third embodiment of the present invention.

FIGS. 1, 3, and 5 illustrate optical arrangements of photographic lens optical systems according to first, second, and third embodiments of the present invention, respectively.

Referring to FIGS. 1, 3, and 5, each of the photographic lens optical systems of the embodiments of the present invention includes a first lens 10 having a positive refractive power, a second lens 20 having a negative refractive power, a doublet lens having a positive refractive power and formed by combining a third lens 30 and a fourth lens 40, a fifth lens 50 having a positive refractive power, and a sixth lens 60 having a positive refractive power that are sequentially arranged in a direction from an object side OBJ to an image side (surface) IMG.

The first lens 10 may have a convex object-side surface. For example, the first lens 10 may have a meniscus shape convex toward the object side OBJ.

The second lens 20 may have a convex object-side surface. For example, the second lens 20 may have a meniscus shape convex toward the object side OBJ.

The doublet lens formed by combining the third lens 30 and the fourth lens 40 may have a concave object-side surface. As shown in FIG. 3, the third lens 30 may be double concave lens, and the fourth lens 40 may be a double convex lens.

The fifth lens 50 and the sixth lens 60 may be double convex lenses.

An aperture stop may be disposed between the second lens 20 and the third lens 30. However, the position of the aperture stop is not limited thereto.

A dummy glass D is disposed between the sixth lens 60 and the image surface IMG. A filter member such as an infrared blocking filter may be disposed at a position of the dummy glass D. In addition, a day-night filter switching device may also be disposed between the sixth lens 60 and the image side IMG. The day-night filter switching device controls the infrared blocking filter according to the amount of light, that is, the infrared blocking filter may operate in the daytime and may not operate at night.

An image sensor (70 as is shown in FIG. 1) such as a charge coupled device (CCD) or a complementary metal oxide semiconductor (CMOS) may be disposed on the image surface IMG.

The lenses of the photographic lens optical systems of the embodiments are configured to satisfy demands for easy aberration correction, wide angle-of-view characteristics, and size/weight reduction.

The first to sixth lenses 10 to 60 may be formed of a glass material or a plastic material. For example, at least one of the first to sixth lenses 10 to 60 may be formed of a plastic material for size reduction. In addition, for aberration correction, at least one of the first to sixth lenses 10 to 60 may have at least one aspheric surface. In this case, the at least one having at least one aspheric surface may be formed of a plastic material for making it easy to perform a manufacturing process.

Each of the photographic lens optical systems may also satisfy the following condition 1:

$$1.5 < Nd2 < 1.7 \tag{1}$$

where Nd2 denotes the refractive index of the second lens 20.

The photographic lens optical system may also satisfy the following condition 2:

$$BFL/f < 1.4 \tag{2}$$

where BFL and f denote the back focal length and the focal length of the photographic lens optical system, respectively. The back focal length refers to the distance from the image surface IMG to a surface of the photographic lens optical system closest to the image surface IMG. That is, the back focal length is the distance from the image side IMG to an image-side surface of the sixth lens 60.

Conditions 1 and 2 are defined to achieve size and weight reduction and improvement of the optical performance of the photographic lens optical systems.

The second lens 20 may be formed of a plastic material satisfying condition 1. In addition, the size and weight of the photographic lens optical system may be reduced by adjusting the ratio of the back focal length to the focal length of the photographic lens optical system to satisfy the condition 2.

In addition, condition 2 may be modified as shown below so as to guarantee a sufficient back focal length.

$$1.2 < BFL/f < 1.4 \tag{2'}$$

The back focal length of the photographic lens optical system may be adjusted according to condition 2', and the day-night filter switching device may be disposed at a back focal point as defined by condition 2'.

Hereinafter, lens data will be described according to the embodiments of the present invention. In lens data, ST denotes an aperture stop, and "*" at the rear of the surface number of a surface denotes that the surface is aspheric. R, T, Nd, and Vd denote a radius of curvature, a thickness or interval, a refractive index, and an Abbe number, respectively. In addition, Fno denotes an F-number, f denotes a focal length, and fov denotes an angle of view. Focal lengths, radii of curvature, and thicknesses or intervals are expressed in millimeters (mm).

Aspheric surfaces are defined as follows.

$$Z = \frac{Y^2}{R(1+\sqrt{1-(1+K)Y^2/R^2})} + AY^4 + BY^6 + CY^8 + DY^{10} \tag{Equation 1}$$

where Z denotes a distance measured from the vertex of a lens in the direction of the optical axis of the lens, Y denotes a distance measured from the optical axis in a direction perpendicular to the optical axis, K denotes a conic constant, A, B, C, and D denote aspheric surface coefficients, and R denotes the radius of curvature at the vertex of the lens.

First Embodiment

FIG. 1 is a cross-sectional view illustrating the optical arrangement of the photographic lens optical system of the first embodiment. Lens data of the first embodiment are shown below.

TABLE 1

| FNo. = 2.3/f = 4.9721 mm/fov = 66.48 deg | | | | |
|---|---|---|---|---|
| Surfaces OBJ | R Infinity | T Infinity | Nd | Vd |
| 1 | 9.3126 | 1.7146 | 1.86 | 23.78 |
| 2 | 18.1544 | 0.1 | | |
| 3* | 4.5812 | 1.0013 | 1.53 | 55.86 |
| 4* | 1.9311 | 2.8911 | | |
| ST | Infinity | 1.1438 | | |
| 6 | −7.2826 | 0.7021 | 1.93 | 20.88 |
| 7 | 16.7408 | 2.2562 | 1.7 | 55.46 |
| 8 | −4.6416 | 0.05 | | |
| 9 | 65.1393 | 1.6873 | 1.7 | 55.46 |
| 10 | −10.8255 | 0.1 | | |
| 11 | 14.5213 | 1.8889 | 1.65 | 58.4 |
| 12 | −26.2169 | 2.345 | | |
| 13 | Infinity | 0.8 | | |
| 14 | Infinity | 3.3197 | | |
| IMG | Infinity | 0 | | |

The following table shows aspheric surface coefficients.

TABLE 2

| Surfaces | K | A | B | C | D |
|---|---|---|---|---|---|
| 3 | −0.0716 | 0.0001 | 0 | 0 | — |
| 4 | −0.0713 | 0.0014 | −0.0014 | 0.0002 | — |

Figure 2:
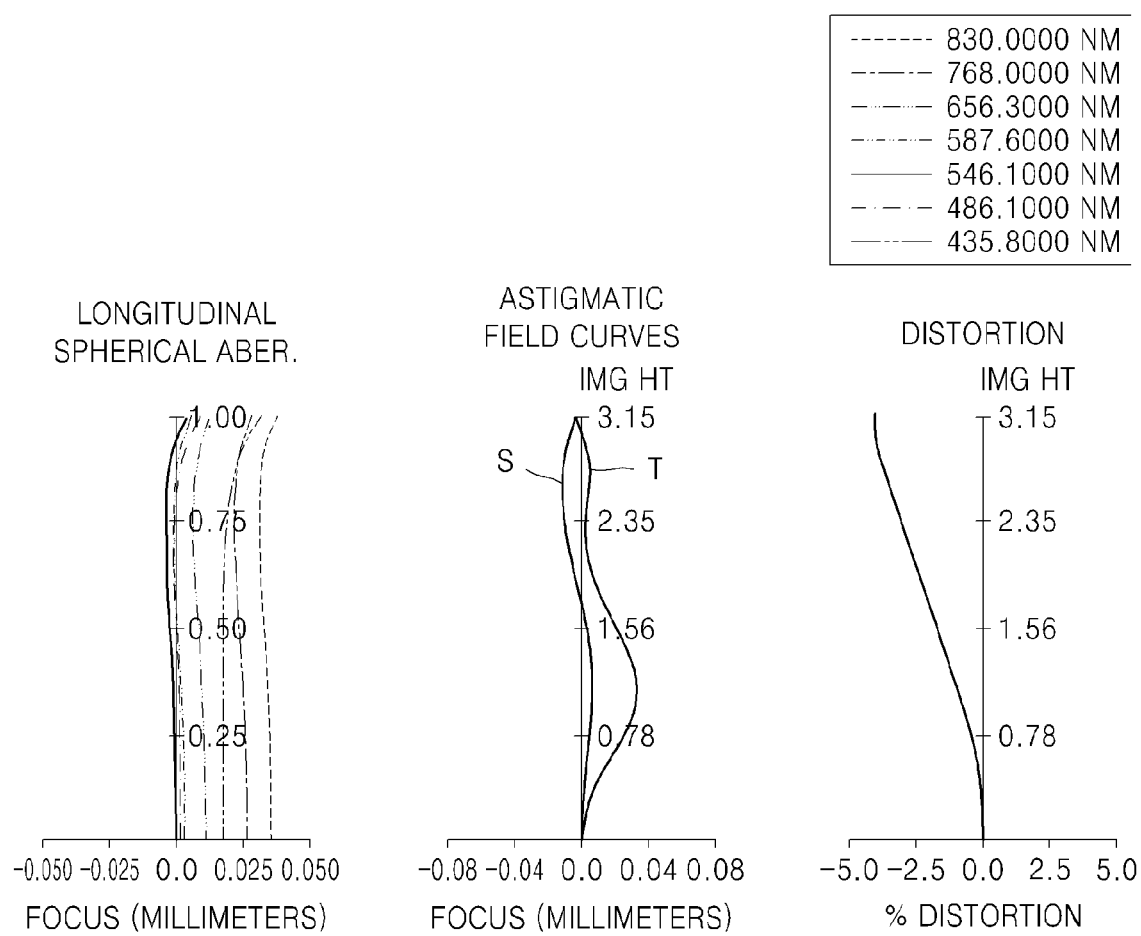
FIG. 2 illustrates a longitudinal spherical aberration, astigmatic field curves, and distortion of the photographic lens optical system of the first embodiment.

FIG. 2 illustrates a longitudinal spherical aberration, astigmatic field curves, and distortion of the photographic lens optical system of the first embodiment. In FIG. 2, the longitudinal spherical aberration is plotted with respect to light having wavelengths of 830.00 nm, 768.00 nm, 656.30 nm, 587.60 nm, 546.10 nm, 486.10 nm, and 435.80 nm, and astigmatic field curves and distortion are plotted with respect to light having a wavelength of 546.10 nm. Regarding the astigmatic field curves, a sagittal field curvature and a tangential field curvature are denoted by S and T, respectively.

Second Embodiment

FIG. 3 is a cross-sectional view illustrating the optical arrangement of the photographic lens optical system of the second embodiment. Lens data of the second embodiment are shown below.

TABLE 3

FNo. = 2.3/f = 4.9832 mm/fov = 66.35 deg

| Surfaces OBJ | R Infinity | T Infinity | Nd | Vd |
|---|---|---|---|---|
| 1 | 8.8418 | 1.8793 | 1.9 | 25.99 |
| 2 | 17.3864 | 0.1 | | |
| 3* | 4.7668 | 0.9897 | 1.53 | 55.86 |
| 4* | 1.9303 | 2.8955 | | |
| ST | Infinity | 0.8254 | | |
| 6 | −7.2373 | 0.7 | 1.92 | 22.04 |
| 7 | 11.165 | 2.4808 | 1.69 | 55.82 |
| 8 | −4.6252 | 0.1 | | |
| 9 | 36.0777 | 1.9552 | 1.7 | 55.46 |
| 10 | −10.3943 | 0.1 | | |
| 11 | 14.3672 | 1.7387 | 1.57 | 67.12 |
| 12 | −24.4874 | 2.345 | | |
| 13 | Infinity | 0.8 | | |
| 14 | Infinity | 3.1014 | | |
| IMG | Infinity | 0 | | |

The following table shows aspheric surface coefficients.

TABLE 4

| Surfaces | K | A | B | C | D |
|---|---|---|---|---|---|
| 3 | −0.0473 | 0.0002 | 0 | 0 | — |
| 4 | −0.0425 | 0.0016 | −0.0014 | 0.0002 | — |

Figure 4:
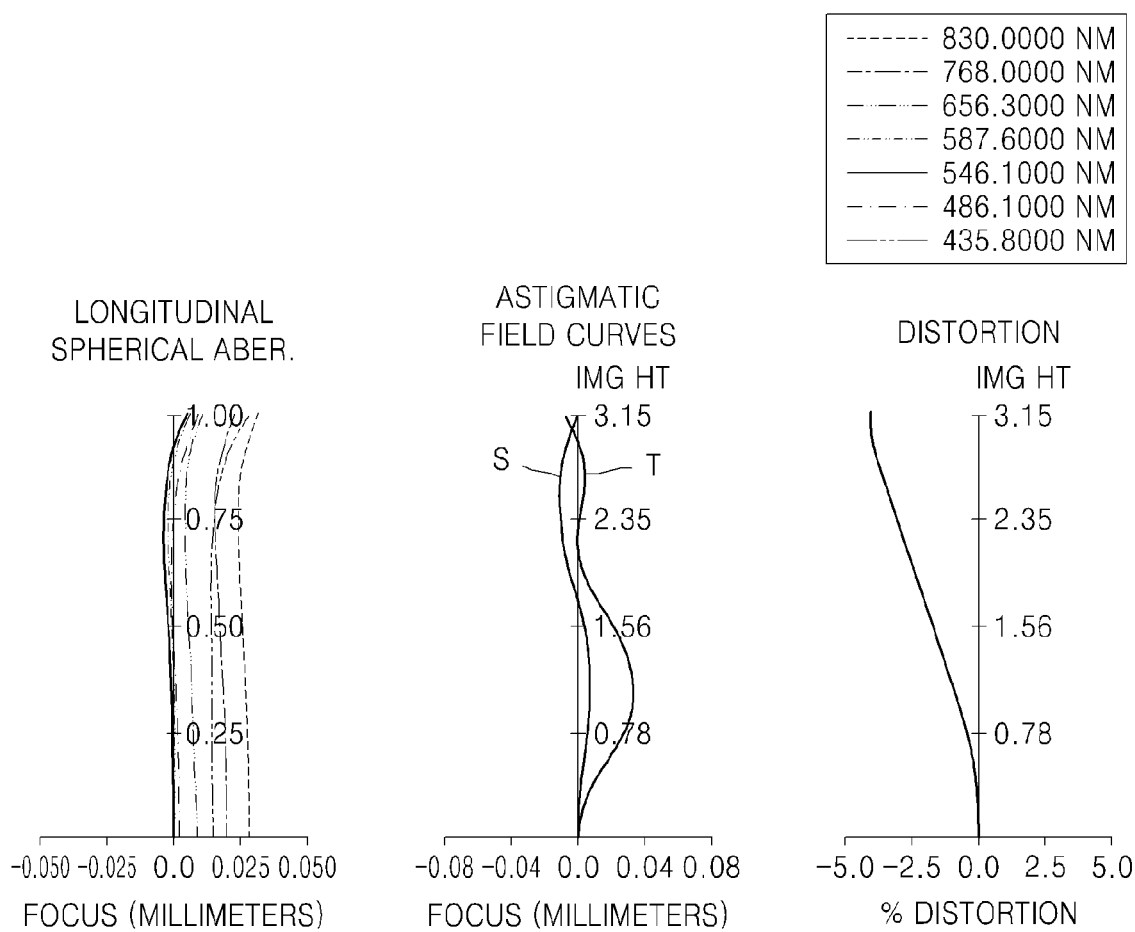
FIG. 4 illustrates a longitudinal spherical aberration, astigmatic field curves, and distortion of the photographic lens optical system of the second embodiment.

FIG. 4 illustrates a longitudinal spherical aberration, astigmatic field curves, and distortion of the photographic lens optical system of the second embodiment.

Third Embodiment

FIG. 5 is a cross-sectional view illustrating the optical arrangement of the photographic lens optical system of the third embodiment. Lens data of the third embodiment are shown below.

TABLE 5

FNo. = 2.3/f = 4.9414 mm/fov = 66.21 deg

| Surfaces OBJ | R Infinity | T Infinity | Nd | Vd |
|---|---|---|---|---|
| 1 | 8.7636 | 1.9428 | 1.89 | 26.28 |
| 2 | 17.5549 | 0.1 | | |
| 3* | 4.6761 | 0.8752 | 1.53 | 55.86 |
| 4* | 1.9505 | 3.0346 | | |
| ST | Infinity | 0.8711 | | |
| 6 | −7.4545 | 0.7059 | 1.93 | 21.73 |
| 7 | 10.6943 | 2.5216 | 1.68 | 56.68 |
| 8 | −4.5905 | 0.0854 | | |
| 9 | 22.9426 | 2.05 | 1.7 | 55.46 |
| 10 | −11.1678 | 0.0807 | | |
| 11 | 16.6637 | 1.4877 | 1.7 | 55.58 |
| 12 | −47.6958 | 2.345 | | |
| 13 | Infinity | 0.8 | | |
| 14 | Infinity | 3.0999 | | |
| IMG | Infinity | 0 | | |

The following table shows aspheric surface coefficients.

TABLE 6

| Surfaces | K | A | B | C | D |
|---|---|---|---|---|---|
| 3 | −0.0346 | 0.0003 | 0 | 0 | — |
| 4 | −0.0554 | 0.002 | −0.0012 | 0.0002 | — |

Figure 6:
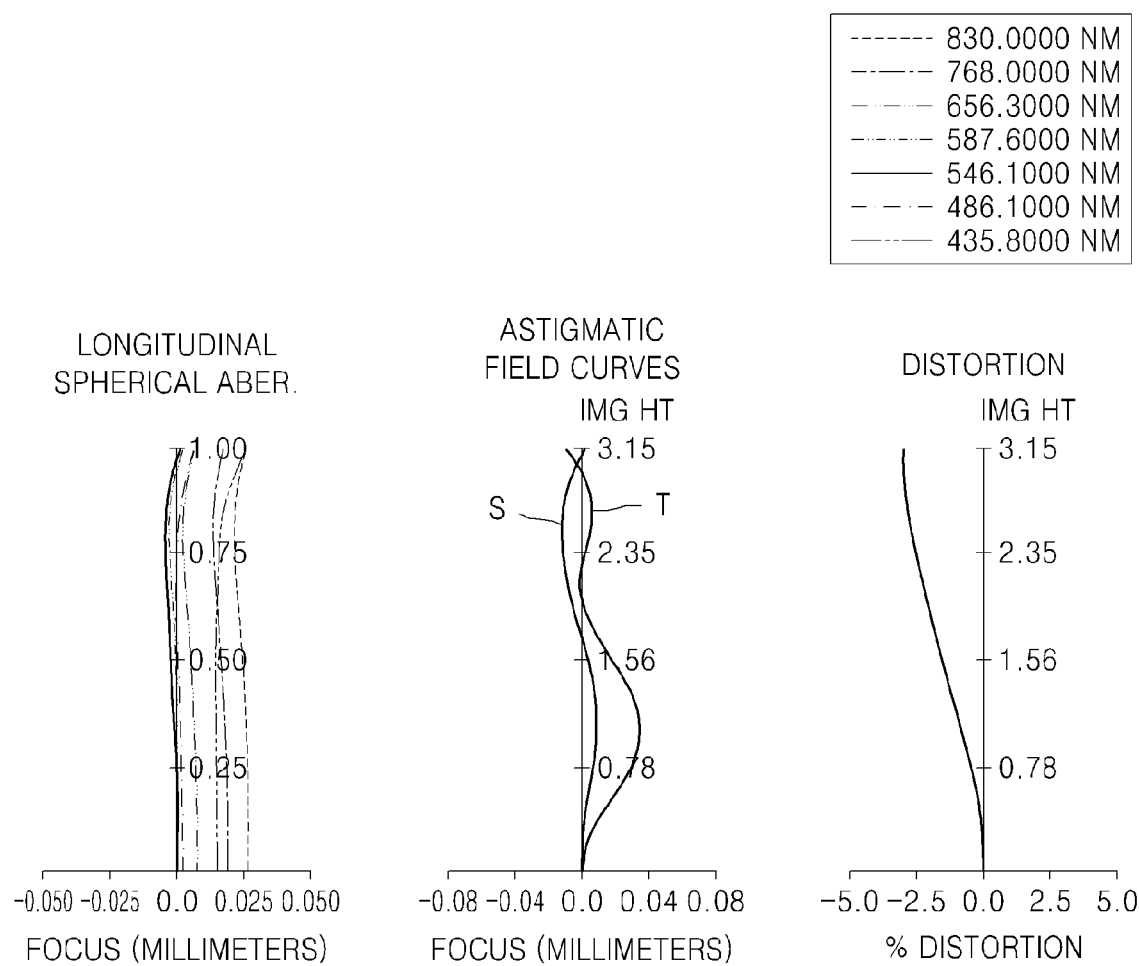
FIG. 6 illustrates a longitudinal spherical aberration, astigmatic field curves, and distortion of the photographic lens optical system of the third embodiment.

FIG. 6 illustrates a longitudinal spherical aberration, astigmatic field curves, and distortion of the photographic lens optical system of the third embodiment.

Table 7 below shows that the photographic lens optical systems of the first to third embodiments satisfy conditions 1 and 2.

TABLE 7

| | Condition 1: Nd2 | BFL | f | Condition 2: BFL/f |
|---|---|---|---|---|
| First embodiment | 1.534 | 6.465 | 4.972 | 1.3 |
| Second embodiment | 1.534 | 6.246 | 4.983 | 1.263 |
| Third embodiment | 1.534 | 6.245 | 4.941 | 1.264 |

According to the embodiments, small and slim photographic lens optical systems having wide angles of view and high optical performance may be provided.

The photographic lens optical systems of the embodiments may be used in various photographing apparatuses together with image sensors converting optical images formed by the photographic lens optical systems into electric signals. Such photographing apparatuses may be used in various electronic devices or other devices such as portable terminals, door phones, and automobiles.

The photographic lens optical systems are constructed by using six lenses to easily correct aberrations and be small and lightweight.

If aspheric lenses of the photographic lens optical systems are formed of a plastic material, the photographic lens optical systems may be manufactured with low costs and allows to the photographic lens optical systems to have high performance.

The photographic lens optical systems may be suitable for use in cameras of vehicles.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A photographic lens optical system comprising:
   a first lens having a positive refractive power and a meniscus shape convex toward an object side;
   a second lens having a negative refractive power and a meniscus shape convex toward the object side;
   a doublet lens having a positive refractive power and formed by combining a third lens and a fourth lens;
   a fifth lens having a positive refractive power and a double convex shape; and
   a sixth lens having a positive refractive power and a double convex shape,
   wherein the first to sixth lenses are sequentially arranged in a direction from the object side to an image side, and the photographic lens optical system satisfies the following condition:

$$1.5 < Nd2 < 1.7$$

where Nd2 denotes a refractive index of the second lens.

2. The photographic lens optical system of claim 1, wherein the doublet lens has a concave object-side surface.

3. The photographic lens optical system of claim 2, wherein the third lens is a double concave lens and the fourth lens is a double convex lens.

4. The photographic lens optical system of claim 1, wherein the photographic lens optical system satisfies the following condition:

$$BFL/f < 1.4$$

where BFL and f denote a back focal length and a focal length of the photographic lens optical system, respectively.

5. The photographic lens optical system of claim 4, wherein the doublet lens has a concave object-side surface.

6. The photographic lens optical system of claim 5, wherein the third lens is a double concave lens and the fourth lens is a double convex lens.

7. The photographic lens optical system of claim 1, wherein at least one lens of the photographic lens optical system is formed of a plastic material.

8. The photographic lens optical system of claim 7, wherein the second lens is formed of a plastic material.

9. The photographic lens optical system of claim 8, wherein the second lens has at least one aspheric surface.

10. The photographic lens optical system of claim 1, further comprising an aperture stop disposed between the second lens and the third lens.

11. A photographing apparatus comprising:
    the photographic lens optical system of claim 1; and
    an image sensor converting an optical image formed by the photographic lens optical system into an electric signal.

* * * * *